May 23, 1939.   M. A. HUEBENER ET AL   2,159,483
ANIMAL TRAP
Filed July 3, 1937    2 Sheets-Sheet 1

INVENTORS
Mary A. Huebener
John U. Jehn
BY
Louis Prevost Whitaker
ATTORNEY

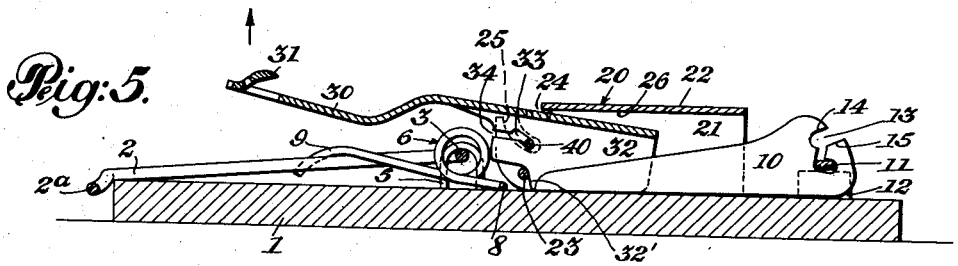
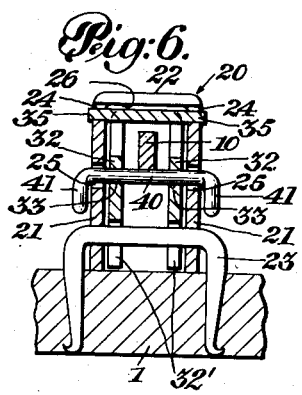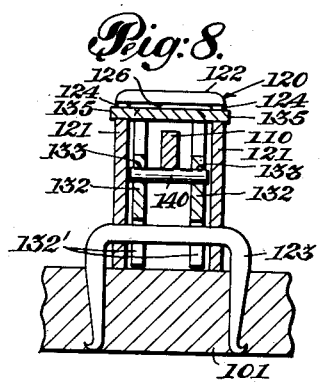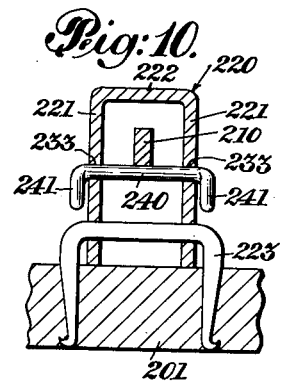
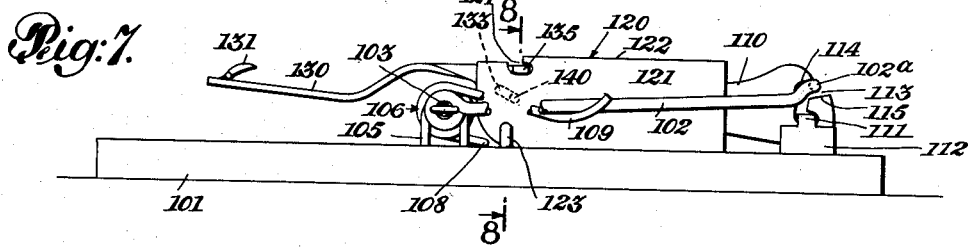
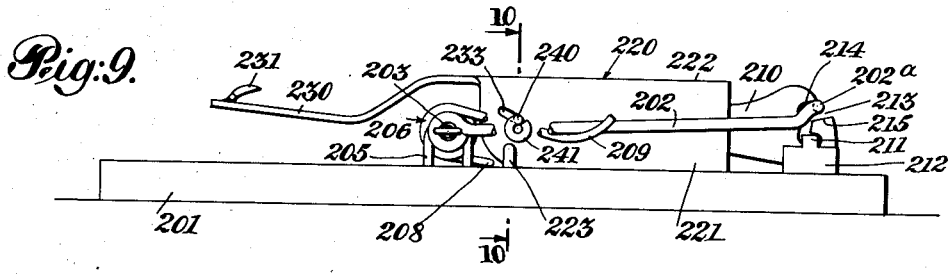

Patented May 23, 1939

2,159,483

UNITED STATES PATENT OFFICE 2,159,483

ANIMAL TRAP

Mary A. Huebener and John U. Lehn, Lititz, Pa., assignors to Animal Trap Company of America, Lititz, Pa., a corporation of Pennsylvania Application July 3, 1937, Serial No. 151,782

17 Claims. (Cl. 43—83)

Our invention relates to animal traps and consists in the novel features hereinafter described, reference being had to the accompanying drawings which show several embodiments of the invention selected by us for purposes of illustration, and the said invention is fully disclosed in the following description and claims.

Referring to the drawings, which form a part of this specification,

Fig. 5 is another view similar to Fig. 3, showing the trap in the releasing position it assumes when sprung by an upward movement of the treadle.

Fig. 6 is a cross sectional view taken on line 6—6 of Fig. 2, and discloses the means by which the parts of the trip lever are pivotally connected and mounted.

Fig. 7 is a side elevational view illustrating a modified embodiment of our invention, and Fig. 8 is a cross sectional view taken on line 8—8 of Fig. 7.

Fig. 9 illustrates in side elevation a further modification embodying certain features of our invention, and Fig. 10 is a cross section taken on line 10—10 of Fig. 9.

Figure 1:
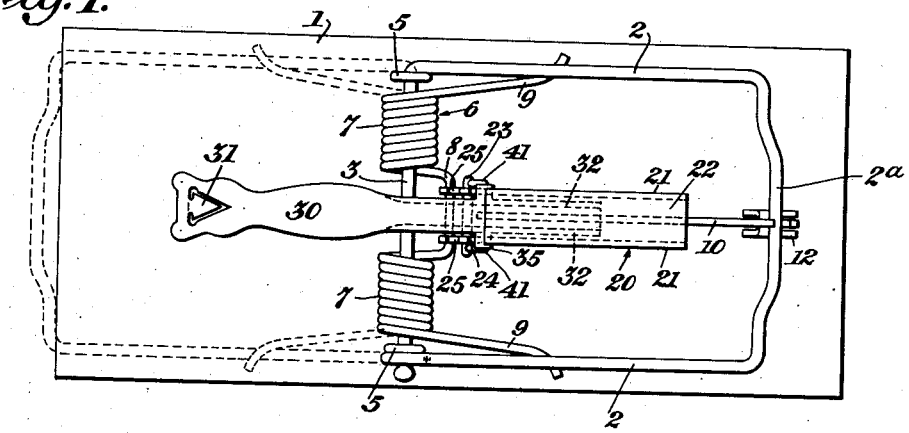
Fig. 1 is a plan view of a trap embodying our invention shown in set position.
Figure 2:
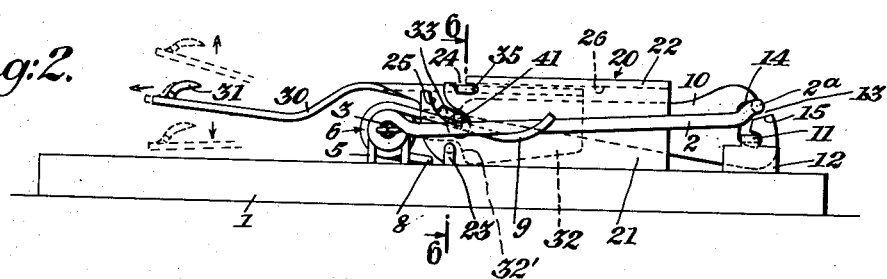
Fig. 2 is a side elevational view thereof.
Figure 3:
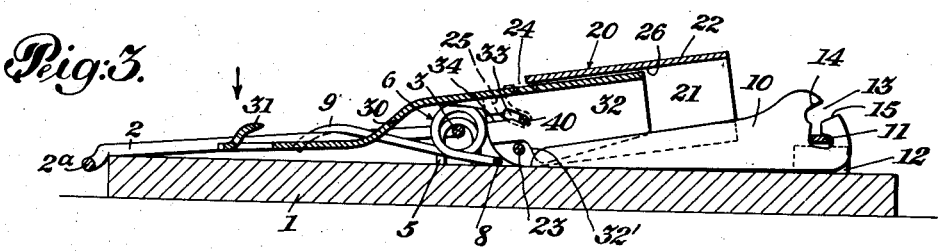
Fig. 3 is a longitudinal sectional view showing the trap in its released or sprung condition with the treadle depressed.

Referring particularly to the construction shown in Figures 1 to 6 inclusive, I indicates the usual rectangular base, the striker or jaw 2 formed in one piece and having an arm 3 pivotally connected with the base by staples 5. The striker is provided with the usual spring 6, which comprises spaced coils 7, 7 surrounding the arms 3, the inner ends of the coils being integrally connected by a web section 8 engaging the base and the outer ends of the coils being provided with arms 9, 9, respectively, engaging adjacent side arms of the striker. A locking member, consisting of a blade 10, is pivotally mounted at 11 adjacent its rear end in a bracket 12, mounted near the rear end of the base. Above the pivot 11 the locking blade has a detent or slot formed therein at 13, to define opposed shoulders 14 and 15, respectively, the upper shoulder 14 being positioned to restrain the jaw in the set position of the trap, as shown in Figures 1 and 2, and the lower shoulder being positioned for engagement by the crossbar 2a of the striker in setting the trap, to rock the locking blade on its pivot and raise the forward end thereof into trigger engaging position.

Centrally of the base, we provide a counterbalanced trip lever having separate arms 20 and 30, of which the rearwardly extending counterweight arm 20 may be pivoted at its forward end on a staple 23 driven into the base. The counterweight arm preferably consists of a metal strip bent substantially U-shaped to form side walls 21—21 and a top wall 22, the top wall terminating short of the forward end of the arm and the upper edges of the side walls having notches 24—24 formed therein to receive pivot pins 35—35 which project integrally from the sides of the lighter forwardly extending bait pedal or treadle arm 30, the notches 24 and the pins 35 preferably underextending the top wall of the counterweight as shown.

The treadle arm 30 extends rearwardly beyond the pivotal engagement, at 35, for abutment against a stop 26 provided by the lower surface of the top wall of the counterweight, thereby preventing relative pivoting of the arms when the bait holding portion 31 of the treadle is depressed while permitting articulation when it is elevated. The rearward portion of the arm 30 extending between the side walls 21 of the counterweight is also formed U-shaped to provide downwardly extending side walls 32—32, having aligned apertures therein at 33, and a light transverse trigger pin 40 is loosely carried in the apertures. These apertures are preferably formed as slots extending diagonally with their lower ends disposed rearwardly, and the forward edges of the side walls 32 are notched, at 34—34, in communication with the upper ends of the slots 33, to facilitate insertion of the pin when the trap is being assembled.

As shown, the pin extends outwardly through cut-away portions 25—25 in the side walls of the counterweight arm and the projecting ends of the pin are bent to provide heads 41—41, preventing endwise withdrawal of the pin. The cutaway areas 25 of the counterweight preferably define deep slots extending downwardly and rearwardly from the top forward end of the counterweight in an arc having its axis at the pivot 35 to permit upward swinging movement of the pin when the arm 30 is pivoted on the counterweight, and the width of the slots 25 corresponds substantially to the diameter of the apertures 33, the forward margins of the slots 25 covering the notches 34 and serving to retain the pin in the apertures.

Constructed as above described, the parts of the trip lever may be very easily assembled. The double headed trigger pin is first dropped through the notches 34 into the diagonal slots 33 in the treadle, and then the pivot pins 35—35 of the treadle are hooked into the notches 24 of the counterweight, the pin automatically falling into the arcuate slots in the counterweight arm. The assembled trip lever is then pivotally secured to the base by the staple 23 to lock the parts in operative position. In this connection it will be noted that portions 32' of the bait pedal side walls extend downwardly in back of the staple 23 for engagement therewith, the staple serving as a stop limiting pivoting movement of the pedal relative to the counterweight when the bait holding portion of the pedal is elevated and preventing the bait pedal from becoming disassembled from the counterweight after the latter is stapled to the base.

Figure 4:
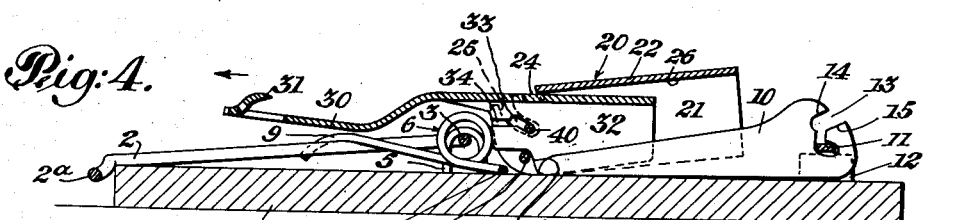
Fig. 4 is a view similar to Fig. 3, showing the trap in the released position it assumes when sprung by a longitudinal outward movement of the treadle.

It will be understood that in the set position of the trap shown in Figures 1 and 2, the jaw or striker is restrained by the shoulder 14, against which it is urged by the spring, thereby pressing the forward end of the pivoted locking blade against the trigger 40, and it will be apparent that any forward movement of the trigger will cause it to be withdrawn from its supporting position and will release the locking blade to spring the trap. Such forward releasing movement of the trigger may be imparted by a disturbance of the bait holding end of the arm 30, either downwardly, upwardly, or forwardly, to the extent indicated by the broken lines in Figure 2. If the bait holding portion of the pedal 30 be depressed, both arms of the tripping lever will rock concentrically forward about the pivot afforded by the staple 23, as though they were integral or rigidly attached together. If the bait holding portion of the pedal be raised, the arm 30 will simply pivot at 35, swinging the trigger pin forwardly and upwardly through the arcuate slots 25 without disturbing the counterweight arm. If the arm 30 be moved longitudinally in a forward direction, again the trigger will be moved forwardly and withdrawn, the counterweight pivoting forwardly on the staple as shown in Figure 4. However, sprung, the trip lever will reassume its normal counterbalanced position in relation to the base immediately after the jaw is released.

To reset the trap, it is only necessary to swing the striker rearwardly against the resistance of the spring until it engages in the slot defined between the shoulders 14 and 15 of the locking blade. As it is swung rearwardly, the jaw impinges against the shoulder 15, causing the locking blade to rotate on its pivot 11 and move the shoulder 14 into locking position over the crossbar 2a, the cammed forward end of the blade swinging upward and momentarily lifting the very light trigger pin from its path. The pin then falls under the locking blade to the lower ends of the slots and is pressurably engaged by the blade, thus restoring the trap to the set position shown in Figures 1 and 2.

It will be noted that, as is usual in traps of this character, the effort arm of the locking lever 10 being that portion extending rearwardly of the pivot 11, is very short compared with the forwardly extending portion, or weight arm. However, in the present construction no portion of the trip lever is required to be moved by the locking blade other than the very light trigger pin, thus permitting the trap to be set with a minimum of effort.

In the embodiment of our invention illustrated in Figures 7 and 8, the parts corresponding with those illustrated in Figs. 1 to 6 inclusive, have been given the same reference numbers with the addition of 100, to avoid repetition. Here the spring actuated striker and the pivoted locking blade are constructed and supported exactly as above described, and the tripping lever is in all respects similar except that the trigger pin 140, is shorter and headless and is loosely retained in apertures 133 of the treadle arm 130 by continuous side wall portions 121 of the counterweight, the side walls 132 of the treadle arm lacking notches such as those indicated at 34 in the previous figures. Thus constructed, the trip lever presents a neater appearance but is less easy to assemble since it is somewhat difficult to keep the loose pin in place while the arms are being hooked together.

In Figures 9 and 10, we have shown a very simple trap embodying our improved trigger construction and obtaining all the operating advantages of the traps heretofore described, except that the trap can only be released by a downward movement of the treadle. In these figures the parts corresponding to those illustrated in Figures 1 to 6 inclusive, are given the same reference characters with the addition of 200, and the spring pressed jaw 202 and the locking blade 210 are formed and arranged precisely as heretofore described in connection with the preceding figures.

Here, however, the treadle arm 230 and counterweight arm 220 of the trip lever are formed integral, the side walls 221 of the counterweight portion having diagonal apertures or slots 233 formed therein to loosely retain a double-headed trigger pin 240 similar to the pin 40 shown in the embodiment first illustrated. Thus made, the trap may be set in precisely the same manner and with the said advantages set forth in connection with the previously described constructions, and may be released from its set position by a slight depression of the treadle arm.

What I claim and desire to secure by Letters Patent is:

1. An animal trap comprising a base, a spring actuated jaw pivotally supported thereon, a pivoted jaw locking member movable vertically in an arc into and out of set position, a pivotally mounted trip lever having spaced side walls, said walls having aligned apertures therein, and a light transverse pin loosely retained in the apertured portions of the side walls, said pin being positioned in the arc of movement of the trigger engaging portion of said locking member for engagement therewith and providing a trigger therefor in the set position of the trap, the pivotal movement of said locking member from released to set position momentarily moving said trigger pin in said apertures to a position out of said arc of movement, said apertures being in the form of slots to permit said lever to remain stationary while said pin is being moved by said locking member.

2. A trap comprising a base, a spring actuated jaw pivoted thereto, a locking blade pivoted to the base movable vertically in an arc into and out of set position and provided at its rear end with a locking detent and a shoulder in the path of the jaw and at its forward end with a trigger engaging portion, a pivoted tripping lever having spaced side walls, said walls having aligned apertures therein, and a light transverse pin loosely retained in the apertured portions of the side walls, said pin being positioned in the arc of movement of the trigger engaging portion of said locking member for engagement therewith and providing a trigger therefor in the set position of the trap, the pivotal movement of said locking member from released to set position momentarily moving said trigger pin in said apertures to a position out of said arc of movement, said apertures being in the form of slots to permit said lever to remain stationary while said pin is being moved by said locking member.

3. An animal trap comprising a base, a spring actuated jaw pivotally supported thereon, a pivoted jaw locking member, a pivotally mounted trip lever having a portion formed substantially U-shaped in cross section and having diagonal slots aligned in its opposite side walls, the lower ends of said slots being disposed rearwardly, and a light transverse pin loosely retained in said slots, said pin being positioned for engagement by said locking member and providing a trigger therefor in the set position of the trap.

4. A trap comprising a base, a spring actuated jaw pivoted thereto, a locking blade pivoted to the base and provided at its rear end with a locking detent and a shoulder in the path of the jaw and at its forward end with a trigger engaging portion, a pivoted tripping lever having a portion formed substantially U-shaped in cross section and having diagonal slots aligned in its opposite side walls, the lower ends of said slots being disposed rearwardly, and a light transverse pin loosely retained in said slots, said pin being positioned for engagement by the forward end of said locking member and providing a trigger therefor in the set position of the trap.

5. In an animal trap having a base, a spring actuated jaw pivotally supported thereon, and a pivoted locking member, a trip lever comprising a counterbalance arm pivoted at its forward end in relation to the base, a separate bait pedal pivotally connected to the arm and extending thereunder for engagement therewith rearwardly of the pivotal connection, and a trigger carried by the bait pedal positioned for engagement by said locking member in the set position of the trap.

6. In an animal trap having a base, a spring actuated jaw pivotally supported thereon, and a pivoted locking member movable vertically in an arc into and out of set position, a trip lever comprising a counterbalance arm pivoted at its forward end in relation to the base, a separate bait pedal pivotally connected to the arm and extending thereunder for engagement therewith rearwardly of the pivotal connection, a rearward portion of said bait pedal having spaced side walls, said walls having aligned apertures therein, and a light transverse pin loosely retained in the apertured portions of the side walls, said pin being positioned in the arc of movement of the trigger engaging portion of said locking member for engagement therewith and providing a trigger therefor in the set position of the trap, the pivotal movement of said locking member from released to set position momentarily moving said trigger pin in said apertures to a position out of said arc of movement.

7. A trap comprising a base, a spring actuated jaw pivoted thereto, a locking blade pivoted to the base and provided at its rear end with a locking detent and a shoulder in the path of the jaw and at its forward end with a trigger engaging portion, a trip lever comprising a counterbalance arm pivoted at its forward end to the base, a separate bait pedal pivotally connected to the arm and extending thereunder for engagement therewith rearwardly of the pivotal connection, a rearward portion of said bait pedal being formed substantially U-shaped in cross section and having diagonal slots aligned in its opposite side walls, the lower ends of said slots being disposed rearwardly, and a light transverse pin loosely retained in said slots, said pin being positioned for engagement by the forward end of the locking blade and providing a trigger therefor in the set position of the trap.

8. In an animal trap having a base, a spring actuated jaw pivotally supported thereon, and a pivoted locking member, a trip lever comprising two separate arms, the one a rearwardly extending counterbalance arm having a pivotal mounting on the base and the other a forwardly extending bait pedal pivotally supported with respect to said counterbalance arm and carrying a trigger for engagement by the locking member in the set position of the trap, said arms being provided with contacting means connecting them for joint swinging movement forwardly about said mounting when the pedal is moved downwardly to spring the trap and permitting relative swinging movement of the bait pedal in a rearward direction, to spring the trap.

9. In a trap having a base, a spring actuated jaw pivotally supported thereon, and a pivoted jaw locking member, a tripping lever comprising a counterweight pivoted at its forward end to the base and a separate bait pedal pivotally connected to the counterweight and extending thereunder for engagement therewith rearwardly of the pivotal connection, said bait pedal having spaced side walls and said counterweight having spaced side walls overextending the side walls of the bait pedal, the bait pedal having aligned apertures formed in the opposite side walls thereof, and the side walls of the counterweight being cut away in register with said apertures and for a considerable distance upwardly and forwardly thereof, and a light double headed trigger pin extending transversely through said apertures and through the side walls of the counterweight at the cut-away areas thereof whereby the pin is loosely retained and positioned for engagement by said locking member in the set position of the trap.

10. In a trap having a base, a spring actuated jaw pivoted thereto, a locking blade pivoted to the base and provided at its rear end with a locking detent and a shoulder in the path of the jaw and at its forward end with a trigger engaging portion, a tripping lever comprising a counterweight pivoted at its forward end to the base and a separate bait pedal pivotally connected to the counterweight and extending thereunder for engagement therewith rearwardly of the pivotal connection, said counterweight having spaced side walls and said bait pedal having spaced side walls extending between the side walls of the counterweight, the bait pedal having diagonal slots aligned in the opposite side walls thereof, the lower ends of said slots being disposed rearwardly, and the side walls of the bait pedal having notches therein extending in communication with the upper ends of said slots, the side walls of the counterweight having slots therein in register with said slots and extending arcuately to the top of the counterweight on an axis at said pivotal connection, and a light double headed trigger pin extending transversely through said slots whereby it is loosely retained and positioned for engagement by the forward end of the locking blade in the set position of the trap.

11. In a trap having a base, a spring actuated jaw pivotally supported thereon, and a pivoted jaw locking member, a tripping lever comprising a counterweight pivoted at its forward end to the base and a separate bait pedal pivotally connected to the counterweight and extending thereunder for engagement therewith rearwardly of the pivotal connection, said bait pedal having spaced side walls and said counterweight having spaced side walls overextending the side walls of the bait pedal, the bait pedal having aligned apertures formed in the opposite side walls thereof, and a light transverse pin having its ends loosely engaged in said apertures and retained therein by the side walls of the counterweight, said pin being positioned for engagement by said locking member and providing a trigger therefor in the set position of the trap.

12. In a trap having a base, a spring actuated jaw pivoted thereto, a locking blade pivoted to the base and provided at its rear end with a locking detent and a shoulder in the path of the jaw and at its forward end with a trigger engaging portion, a tripping lever comprising a counterweight pivoted at its forward end to the base and a separate bait pedal pivotally connected to the counterweight and extending thereunder for engagement therewith rearwardly of the pivotal connection, said bait pedal having spaced side walls and said counterweight having spaced side walls overextending the side walls of the bait pedal, the bait pedal having aligned apertures formed in the opposite side walls thereof, and a light transverse pin having its ends loosely engaged in said apertures and retained therein by the side walls of the counterweight, said pin being positioned for engagement by the forward end of the locking blade in the set position of the trap.

13. An animal trap comprising a base, a spring actuated jaw pivotally supported thereon, a pivoted jaw locking member movable vertically in an arc into and out of set position, a trip lever pivoted on the base having a forwardly extending treadle arm and an integral rearwardly extending counterweight arm, said counterweight arm having side walls, said side walls having aligned apertures formed therein, and a light transverse trigger pin of less diameter than said apertures loosely retained therein and positioned in the arc of movement of the trigger engaging portion of said locking member from engagement therewith in the set position of the trap, the ends of said pin extending outwardly of the side walls of the counterweight arm and having heads formed thereon to prevent endwise withdrawal of the pin, the pivotal movement of said locking member from released to set position momentarily moving said trigger pin in said apertures to a position out of said arc of movement, said apertures being in the form of slots to permit said lever to remain stationary while said pin is being moved by said locking member.

14. In an animal trap having a base, a spring actuated jaw pivoted thereto, a locking blade pivoted to the base and provided at its rear end with a locking detent and a shoulder in the path of the jaw, and at its forward end with a trigger engaging portion, a tripping lever pivoted on the base having a forwardly extending treadle arm and an integral rearwardly extending counterweight arm, said counterweight arm being formed substantially U-shaped in cross section to provide spaced side walls, said side walls having aligned diagonal slots formed therein, the lower ends of said slots being disposed rearwardly, and a light transverse trigger pin loosely engaged in the slots and positioned for engagement by the forward end of the locking blade in the set position of the trap, the ends of said pin extending outwardly of the side walls of the counterweight arm and having heads formed thereon to prevent endwise withdrawal of the pin.

15. In a trap having a base, a spring actuated jaw pivotally supported thereon, and a pivoted jaw locking member, a tripping lever comprising a counterweight pivoted at its forward end to the base and a separate bait pedal pivotally connected to the counterweight and having a portion extending under the counterweight for engagement therewith rearwardly of the pivotal connection, said bait pedal and counterweight each having spaced side walls, the side walls of the one extending between the side walls of the other, the bait pedal having aligned apertures formed in the opposite side walls thereof and the side walls of the counterweight being cut away in register with said apertures and for a considerable distance upwardly and forwardly thereof, and a light double headed trigger pin extending transversely through said apertures and through the side walls of the counterweight at the cutaway areas thereof whereby the pin is loosely retained and positioned for engagement by said locking member in the set position of the trap.

16. In a trap having a base, a spring actuated jaw pivotally supported thereon, and a pivoted jaw locking member, a tripping lever comprising a counterweight having a pivotal mounting on the base and a separate bait pedal pivotally connected to the counterweight and extending thereunder for engagement therewith rearwardly of the pivotal connection to limit relative pivoting of the pedal in one direction, said bait pedal having spaced side walls with aligned apertures formed therein, and a light transverse trigger pin loosely retained in said apertures, said pin being positioned for engagement by the locking member in the set position of the trap, portions of the side walls of the bait pedal extending downwardly in back of said pivotal mounting for engagement therewith to limit pivoting of the pedal relative to the counterweight in the other direction and to lock the parts in operative relation.

17. In a trap having a base, a spring actuated jaw pivotally supported thereon, and a pivoted jaw locking member, a tripping lever comprising a counterweight pivoted at its forward end to the base and a separate bait pedal pivotally connected to the counterweight and having a portion extending under the counterweight for engagement therewith rearwardly of the pivotal connection to limit relative pivoting of the pedal in one direction, said bait pedal having spaced side walls with aligned aperatures formed therein, and a light transverse trigger pin loosely retained in said apertures, said pin being positioned for engagement by the locking member in the set position of the trap, and a side wall portion of the bait pedal extending downwardly for engagement against the base to limit pivoting of the pedal relative to the counterweight in the other direction.

MARY A. HUEBENER.
JOHN U. LEHN.